United States Patent [19]
Satoh et al.

[11] Patent Number: 5,302,990
[45] Date of Patent: Apr. 12, 1994

[54] METHOD AND APPARATUS FOR DISPLAYING RECORDABLE DATA IN A CAMERA

[75] Inventors: Muneyoshi Satoh; Junichi Iwamoto; Haruo Onozuka, all of Saitama, Japan

[73] Assignee: Fuji Photo Film Co., Ltd., Kanagawa, Japan

[21] Appl. No.: 776,167

[22] Filed: Oct. 15, 1991

[30] Foreign Application Priority Data

| Oct. 19, 1990 | [JP] | Japan | 2-109965[U] |
| Oct. 19, 1990 | [JP] | Japan | 2-109966[U] |
| Oct. 19, 1990 | [JP] | Japan | 2-282597 |
| Oct. 19, 1990 | [JP] | Japan | 2-282598 |
| Oct. 19, 1990 | [JP] | Japan | 2-282599 |
| Oct. 19, 1990 | [JP] | Japan | 2-282600 |

[51] Int. Cl.$^5$ ................................. G03B 17/24
[52] U.S. Cl. .................................. 354/106
[58] Field of Search .......... 354/105, 106, 289.1, 354/289.12, 289.11

[56] References Cited

U.S. PATENT DOCUMENTS

| 4,449,805 | 5/1984 | Sakurada et al. | 354/105 |
| 4,483,601 | 11/1984 | Sekida et al. | 354/288 |
| 4,825,233 | 4/1989 | Kanai et al. | 354/106 |
| 4,958,174 | 9/1990 | Goto et al. | 354/106 |
| 5,155,513 | 10/1992 | Matsumura et al. | 354/106 |

FOREIGN PATENT DOCUMENTS 0134626 5/1990 Japan ................... 354/105

Primary Examiner—Richard A. Wintercorn
Assistant Examiner—Nicholas J. Tuccillo
Attorney, Agent, or Firm—Young & Thompson

[57] ABSTRACT

In a selectable data recording mode for setting freely selectable character data and for recording them on a photographic film concurrently with photographing, an array of characters is displayed as data to be revised. One of these characters is designated to be changed by shifting the position of blinking along a linear display. Thereafter, upon depression of a key, a plurality of character groups of various kinds are displayed from one kind to another in a predetermined sequence. When a desired kind of character group is displayed, a desired one of character groups of this kind is selected by another key, and a character to be set is selected from among the one group. Each time a character to be set is selected, the character is temporarily stored in a memory, and the character data to be revised are displayed so as to designate the next character to be changed and, thereafter, the character groups are displayed so as to permit selecting a new character to be set. When the data revision is completed, the new character data are stored until revised.

28 Claims, 11 Drawing Sheets

FIG. 3

| GROUP | | | | | | | | | | |
|---|---|---|---|---|---|---|---|---|---|---|
| GROUP 1 | ア | イ | ウ | エ | オ | カ | キ | ク | ケ | コ |
| GROUP 2 | サ | シ | ス | セ | ソ | タ | チ | ツ | テ | ト |
| GROUP 3 | ナ | ニ | ヌ | ネ | ノ | ハ | ヒ | フ | ヘ | ホ |
| GROUP 4 | マ | ミ | ム | メ | モ | ヤ | ユ | ヨ | [ ] | [ ] |
| GROUP 5 | ラ | リ | ル | レ | ロ | ワ | ヲ | ン | ″ | ゜ |
| GROUP 6 | ァ | ィ | ゥ | ェ | ォ | ャ | ュ | ョ | ッ | ー |
| GROUP 7 | A | B | C | D | E | F | G | H | I | J |
| GROUP 8 | K | L | M | N | O | P | Q | R | S | T |
| GROUP 9 | U | V | W | X | Y | Z | , | . | ' | [ ] |
| GROUP 10 | 1 | 2 | 3 | 4 | 5 | 6 | 7 | 8 | 9 | 0 |
| GROUP 11 | 「 | 」 | ! | & | / | ♪ | ♡ | ♀ | ◇ | ★ |

90

RECORDING-OFF MODE

METHOD AND APPARATUS FOR DISPLAYING RECORDABLE DATA IN A CAMERA

BACKGROUND OF THE INVENTION

1. Field of the Invention

The present invention relates to a method of, and an apparatus for, displaying recordable data in a camera. The present invention relates especially to a method of, and an apparatus for, displaying recordable data composed of characters which can be selectively set by the photographer, so as to record on a photograph information about the photograph.

2. Prior Art

It is conventional to record photographic data, typically the date of the photograph, on a photographic film in a camera, so as to indicate that date on the prints. Recently, there have been cameras wherein not only the date or time of the photograph but also a predetermined caption, such as "Merry Xmas", "Happy New Year" or the like, can be recorded along with the picture, by previously memorizing data on those captions.

An example of such types of conventional cameras is shown in FIG. 11, which has a display panel 1 for displaying the recording data, that is, photographic data and/or a caption. The display panel 1 is disposed on a rear cover 3 of a camera body 2. Below the display panel 1, there are disposed a mode change key (hereinafter referred to as an M key) 6 and a selection key (hereinafter referred to as an S key) 7. Designated by 15 and 16 are a viewfinder and a shutter button, respectively.

In this camera, the M key 6 is intended to display one of a plurality of predetermined photographic modes, such as a date recording mode, a time-of-day recording mode, or a caption recording mode, on the display panel 1. These modes are changed one after another in cyclic fashion upon each depression of the M key 6. For example, upon depression of the M key 6 in the time-of-day recording mode, the caption recording mode is set, and thus the first caption 60, e.g. "Merry Xmas", is displayed on the display panel 1. Upon depression of the S key 7 in the caption recording mode, the second caption 61, e.g. "'90 お正月", which means "'90 New Year's Day", is displayed in Japanese, using the cursive Kana and Chinese characters. Upon the next depression of the S key 7, the third caption 62, e.g. "'90 ウントウカイ", which means "'90 An Athletic Meet", is displayed in Japanese, using the Katakana characters. Upon each depression of the S key 7, the first to fifth captions 60 to 64 are displayed one after another on the display panel 1, so that a selected one of these captions can be photographically recorded as data on a photographic film upon depression of the shutter button 16. Even when the display panel 1 displays one of the captions 60 to 64, if the M key 6 is depressed, the camera proceeds from the caption recording mode to the date recording mode, or another mode.

However, the variety of captions that can be recorded by the conventional cameras is limited to a predetermined range, for example five variations as in the camera of FIG. 11.

To solve this problem, a camera has been proposed wherein the photographer can arrange an array of characters as data relating to an individual picture frame, the data being recorded on a photographic film. Although such a camera broadens the range of options for recording data, the conventional recording data selection is time consuming, because respective characters to be displayed and recorded must be selected while cyclically displaying a series of characters in each display position of the display panel 1.

If, for example, the photographer intends to record as photographic data "zoo 9/18", as shown in FIG. 12, because a character "z" must be displayed in the first display position 1a, it is necessary successively to display all the alphabet characters "a, b, c, d . . . " in the first display position 1a so as to select the last letter "z". As for the other display positions, it is necessary to repeat a similar display sequence until desired characters are displayed. This is obviously cumbersome and boring, especially in the case where many characters, e.g. 10 characters in FIG. 12, are necessary to compose a desired recordable text.

Furthermore, considering the above cumbersome selection operation, the range of kinds of characters available for optional character recording is narrower than that of the conventional predetermined captions, for example, to alphabetical and numerical characters. Therefore, the variety of character arrangements, and thus the variety of recordable data, is insufficient.

OBJECTS OF THE INVENTION

In view of the foregoing, an object of the present invention is to provide a recordable data display method for a camera, wherein an array of characters constituting recordable data can be quickly set, and the variety of available character arrangements is wide.

Another object of the present invention is to provide a method of displaying simultaneously a plurality of characters as a character group, so as efficiently to select desired character data.

Still another object of the present invention is to provide a method of selecting the spacing between the characters.

A further object of the present invention is to provide a recordable data display apparatus for a camera, which practices the method of the present invention.

SUMMARY OF THE INVENTION

To achieve the above and other objects, according to the present invention, various kinds of characters available for setting selectable character data are grouped into several character groups, each group having at most a predetermined number of different characters of the same character kind, and these character groups are displayed group by group in a predetermined sequence on a display device which is commonly used to display the recording data.

It is possible sequentially to select a character from among one of these character groups as a new character to be set as an element of the desired recordable data.

Symbols are included in the available character kinds, and at least one of the character groups includes a symbol indicative of a blank space, so that it is possible to set blank spaces between characters.

In order quickly to display the desired kind of character group, a character kind transfer key is provided for transferring from a leading group of one kind of character group to a leading group of another kind while skipping over several character groups.

BRIEF DESCRIPTION OF THE DRAWINGS

Other objects and advantages of the invention will become apparent from the following description when read in conjunction with the accompanying drawings, wherein like reference characters designate like or corresponding parts throughout the several views:

FIG. 3 is a data menu illustrating available character groups that can be displayed;

DETAILED DESCRIPTION OF THE PREFERRED EMBODIMENTS

Figure 1:
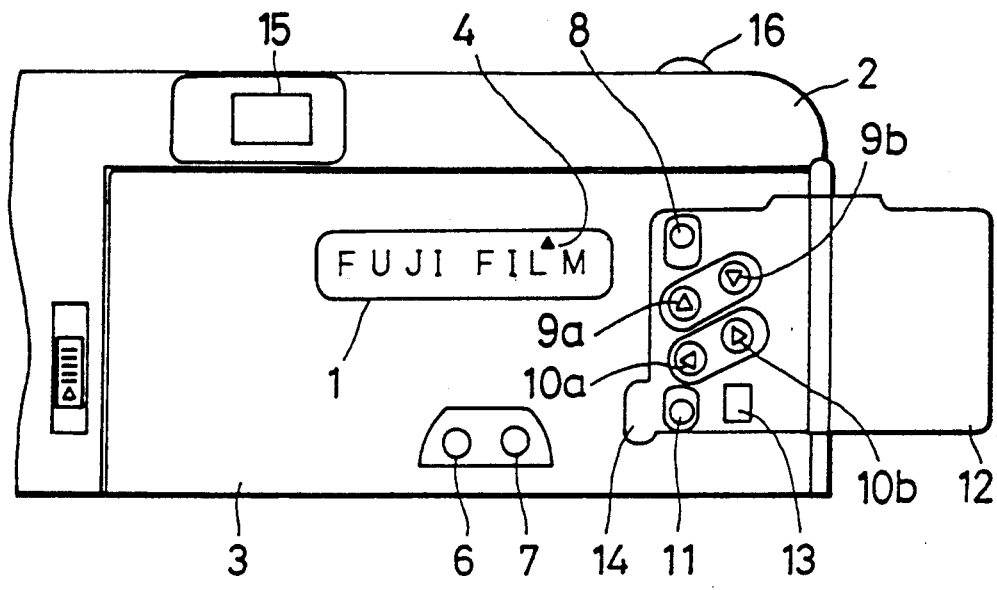
FIG. 1 illustrates a camera having a recordable data display device according to the present invention.
Figure 2A:
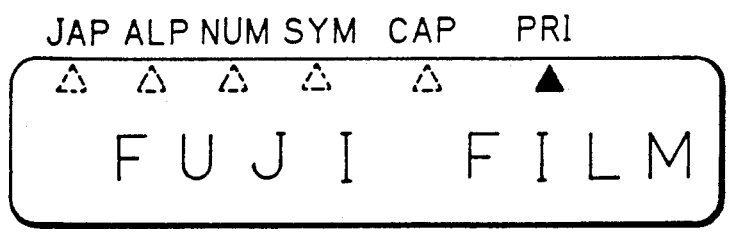
FIGS. 2A and 2B show examples of display on the display panel of FIG. 1.
Figure 2B:
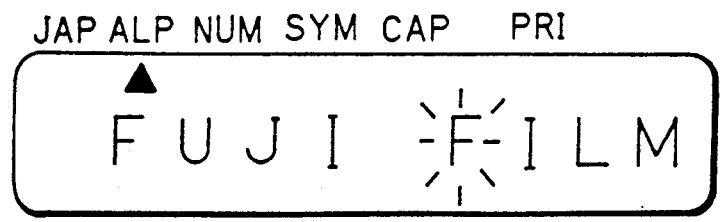

FIG. 1 illustrates a camera embodying the present invention, wherein a display panel 1 is disposed on a rear cover 3 of a camera body 2. The display panel 1 has, for example, ten display segments each capable of displaying a character, inclusive of symbols. The display panel 1 also has an indicator portion 4 having index positions marked by "KANA", "ALP", "NUM", "SYM", "CAP" AND "PRI" arranged on the rear cover 3 along a margin of the display panel 1. One of these index positions is designated by a triangular mark, or the like, which is displayed on the display panel 1 in registry with the corresponding index position. The index positions "KANA", "ALP", "NUM" and "SYM" are used for indicating the kind of a character (including a blank space symbol) now displayed or which can be displayed on the display panel 1, that is, Japanese Kana script, the Roman alphabet, numerals, and symbols, respectively. The character which is possible to be selected as a component of recordable data will be referred to hereinafter as a prospective new character. In this way, the indicator portion 4 makes it possible to recognize the kind of prospective new character.

Figure 11:
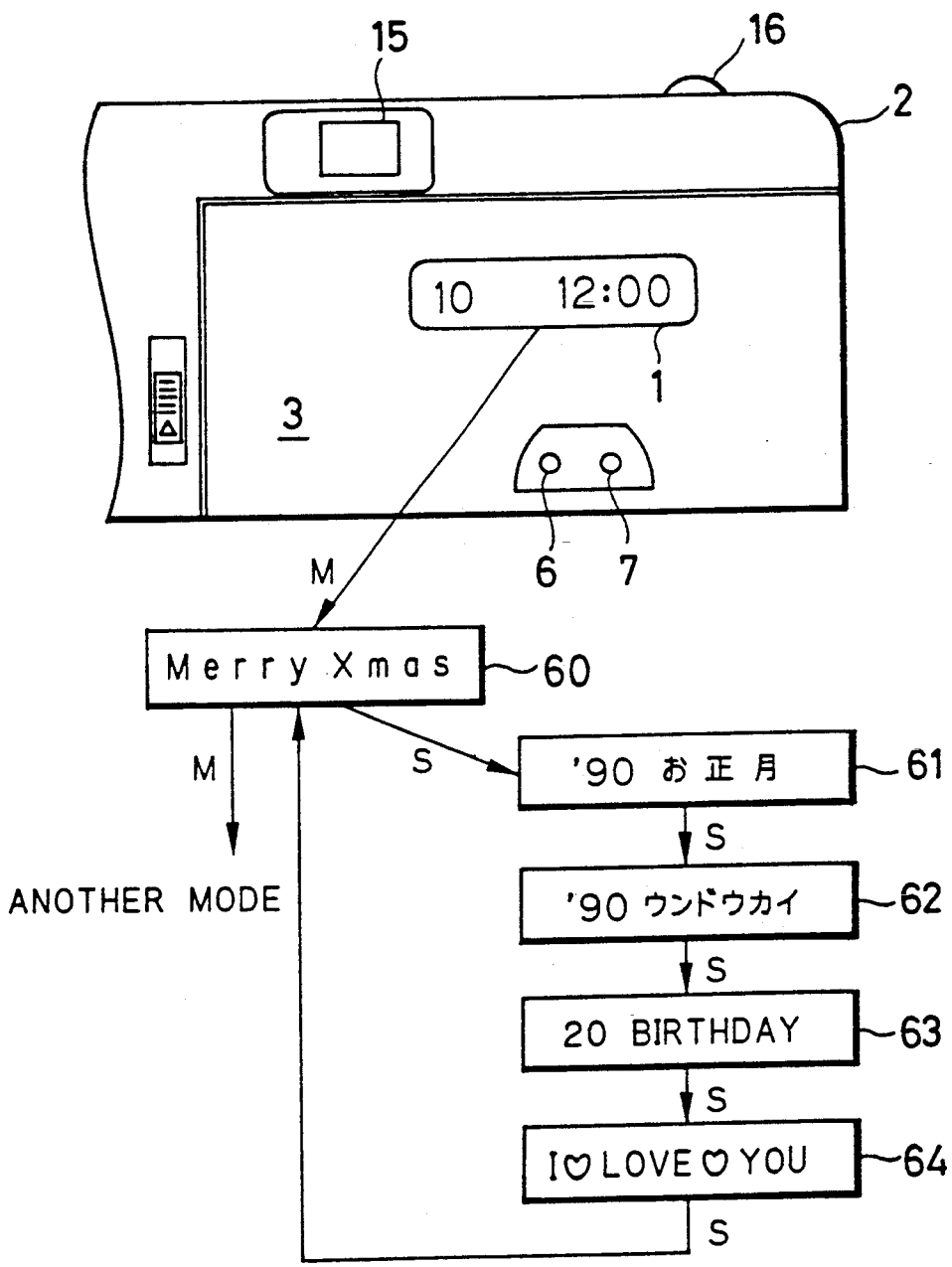
FIG. 11 shows a prior art display apparatus for a camera.
Figure 12:
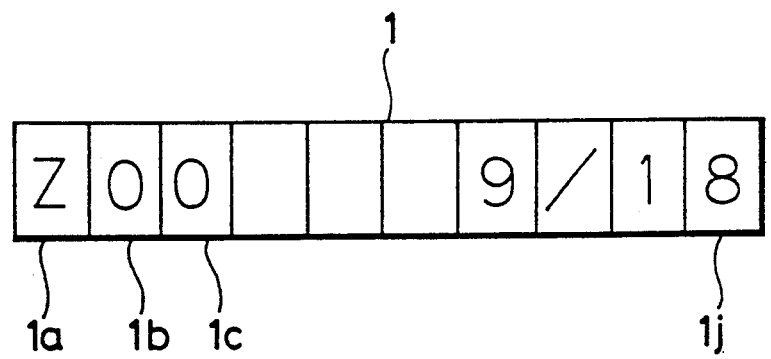
FIG. 12 shows a display panel of the prior art.

The index positions "CAP" and "PRI" are used for indication of a caption recording mode and a data recording state, respectively. In the caption recording mode, it is possible to select one of predetermined captions such as "Merry Xmas", as is described above with respect to the prior art shown in FIGS. 11 and 12.

The rear cover 3 is further provided with several operating keys. An M key (mode change key) 6 is used for changing over between a date recording mode, a time-of-day recording mode, the caption recording mode, a selectable data recording mode, and a no-record mode. In the selectable data recording mode, it is possible selectively to set an array of at most ten characters as selected recordable data. In the non-recording mode, data recording on the photographic film is inhibited. The details of this function will be described later.

An S key (selection key) 7 is used for selecting one of a plurality of predetermined or ready-made captions. In the embodiment shown in FIG. 1, the S key also serves as a character kind change key in the selectable data recording mode, so as to simplify the keying operation. There are also provided keys 8, 9a, 9b, 10a, 10b and 11 for setting an array of characters as selected recordable data. These keys 8 to 11 are disposed in a recessed portion 14 of the rear cover 3, and are usually covered by a lid 12 which is pivotally mounted on the rear cover 3. 13 designates a magnet for removably fastening the lid 12 in the closed position wherein the keys 8 to 11 are protected from external access. So as to facilitate opening the lid 12, the recessed portion 14 partially extends beyond the covering range of the lid 12.

In the selectable data recording mode, the display panel 1 displays simultaneously a plurality of prospective new characters of the same kind. According to the embodiment illustrated in FIG. 3, characters to be displayed as prospective new characters are classified into eleven groups each consisting of ten characters. The Japanese Kana characters are grouped in the first to sixth character groups, whereas the Roman alphabet is grouped in the seventh to ninth character groups. The tenth character group contains numerals, and the eleventh character group contains various symbols.

Because the display panel 1 of the present embodiment can display simultaneously ten characters, it is reasonable and efficient to use all of the ten display segments for displaying prospective characters. If the number of characters that can be displayed simultaneously on the display panel 1 is other than ten, the number of simultaneously displayed prospective characters, that is, the number of characters contained in each character group, may be set at another corresponding value.

The first to eleventh character groups are not necessarily displayed in this order, but it is possible to jump or skip over several character groups into another group of different character kind, so as quickly to display a desired kind of character.

Figure 4:
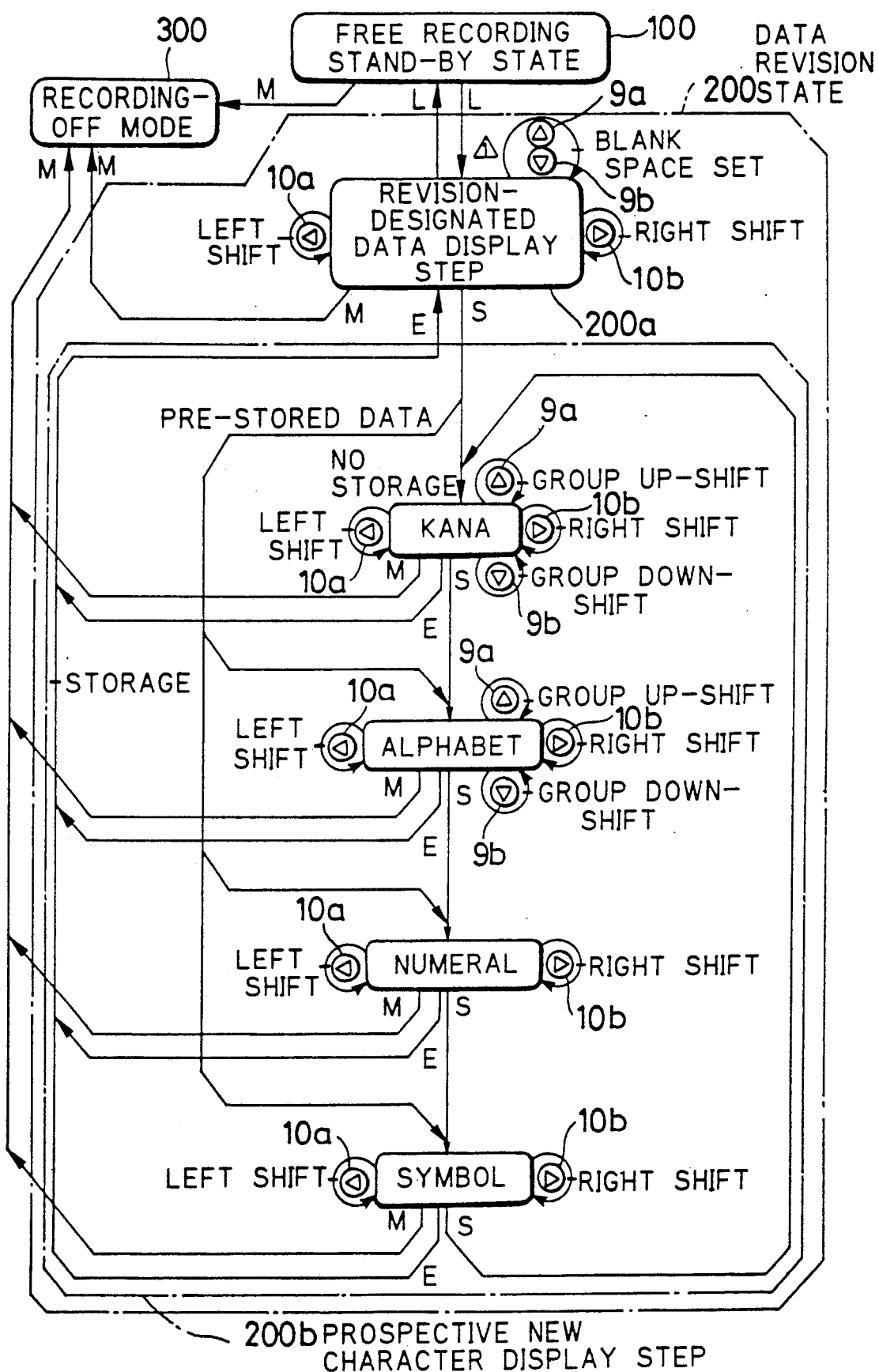
FIG. 4 is a flow chart illustrating a sequence of operations in a selectable data recording mode.

As can be seen from the flow chart of FIG. 4, upon actuation of the S key 7 in the data revision state, the first group of the Kana characters is displayed. Thereafter, upon each actuation of the S key 7, the displayed character kind is changed from the Kana to the Roman alphabet, from the Roman alphabet to numerals, from numerals to symbols, from symbols to Kana, in cyclic fashion, while skipping over several character groups.

The key 8 serves as an enabling key (L key) for enabling and disabling recordable data revision. When the L key 8 is actuated in the selectable data recording mode, it shifts from a selectable recording stand-by state 100 to a data revision state 200. In the first step 200a (revision-designed data display step) of the data revision state 200, it is possible to designate on the display a segment whose content is to be changed or in which a new character is to be displayed.

The keys 9a and 9b are respectively an UP key and a DOWN key for shifting one character group to another of the same character kind, so as to display this kind of character group by group as prospective new characters on the display panel 1 (prospective new character display step 200b).

After selecting a desired character kind in this way, a character group of this kind is selected by actuating the UP key 9a or the DOWN key 9b. For example, when the Kana characters of the first character group are displayed, upon actuation of the UP key 9a, the second character group is displayed. If the DOWN key 9b is actuated when the first character group is displayed, the Kana characters of the sixth character group are displayed.

The keys 10a and 10b are a left shift key and a right shift key for shifting the blinking position to the left or right within the display segments of the display panel 1, so as to select a character from the presently displayed character group. The key 11 is a decision key (E key) for designating one of the prospective new characters as a new character to be displayed on the display segment that has been designated to be changed. Upon actuation of the E key 11 after designating the desired character, the character is embodied as a component of the recordable data, and the process returns to the revision-designated data display step 200a. The same process as above is repeated for each component of the recorded data.

Figure 5:
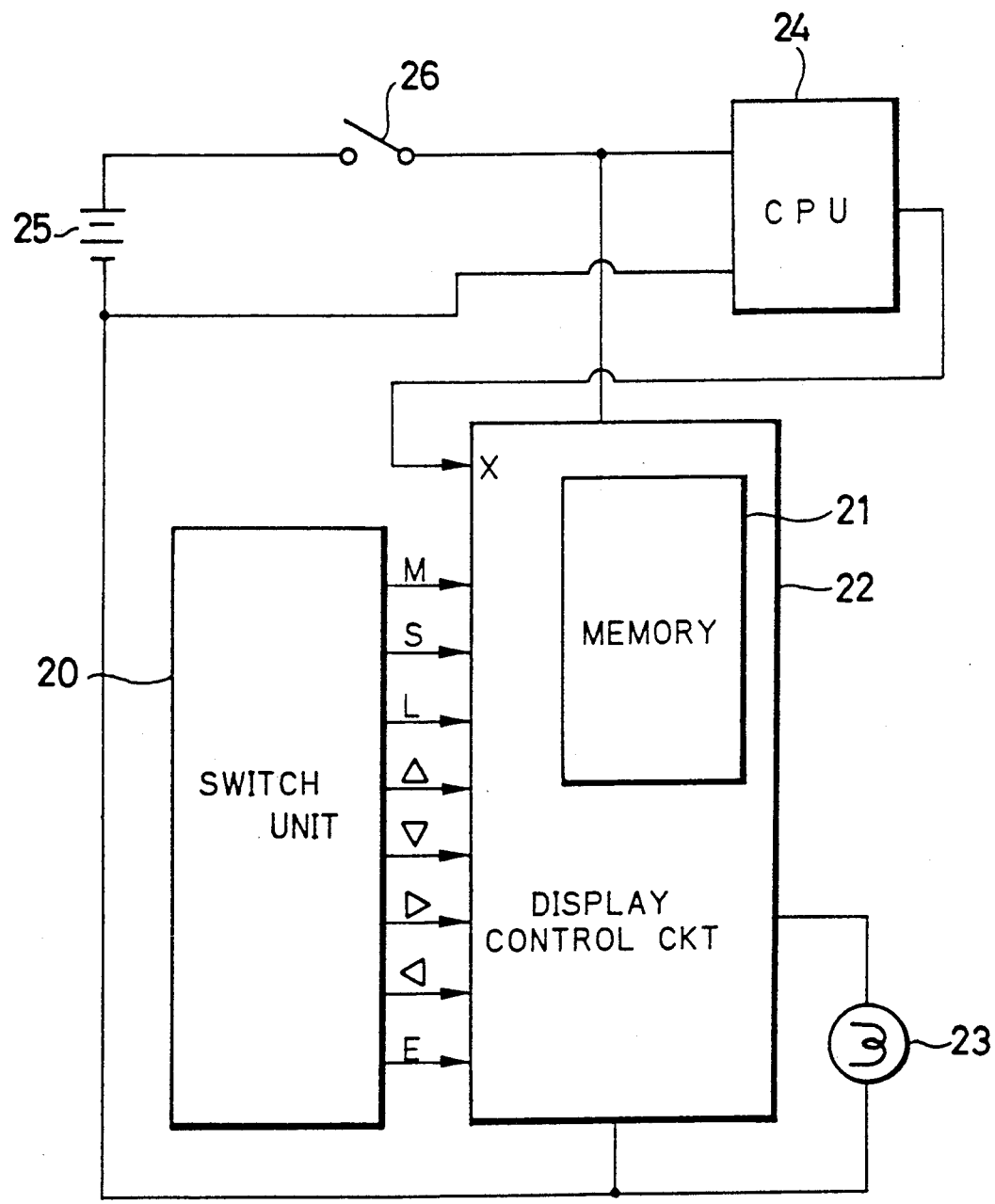
FIG. 5 is a block diagram showing circuitry of the recordable data display device.

Referring to FIG. 5 showing the circuity of the recordable data display apparatus, a switch unit 20 consisting of the above-described keys 6 to 11 is connected to a display control circuit 22 containing a memory 21. The display control circuit 22 controls the display of characters in respective modes such as the caption recording mode and the selectable data recording mode. The memory 21 stores data on the predetermined captions and character data which are set in the selectable data recording mode, and other data.

When storing selected character data, each time a character is selected by the E key 11, the character is stored temporarily in the memory 21, and the storage of all characters constituting the character data to be recorded is not performed unless the L key 8 is actuated to change over from the data revision state to the selected data recording stand-by state in the selected data recording mode. If the M key 6 is actuated in the course of revision of the display, the selected data recording mode is released, and the non-recording or recording-off mode 300 is set. At the same time, the temporarily stored characters selected by the E key 11 are deleted, and the data stored prior to the display revision operation are revived. Therefore, it is possible to cancel the revision by once actuating the E key 11, and thus there is no need for a specific cancel key. Furthermore, it is easy to perform mode change from the selectable data recording mode to another.

The display control circuit 22 also controls the indicator portion 4 such that the triangular mark is displayed at a position corresponding to the present mode "CAP" or "PRI" during mode selection. When the selectable data recording mode is selected, the triangular mark is displayed to a position corresponding to the kind of prospective new characters.

The display control circuit 22 is connected to a lamp 23 for optically recording the selected characters on the photographic film, and also to a central processing unit (CPU) 24 which controls the overall operation of the camera. These circuits are activated when a battery 25 loaded in an appropriate position in the camera is turned on by a power switch 26. In the selectable data recording mode, an array of characters is selected through the switch unit 20 and displayed on the display panel 1. Thereafter, the data relating to the selected characters are stored in the memory 21. Upon depression of the shutter button 16 in this state, the CPU 24 outputs a recording command to the display control circuit 22, which then outputs an emission signal to the lamp 23. In this way, the lamp 23 emits light simultaneously with shutter actuation, so that the characters displayed on the display panel 1 are optically recorded on the film simultaneously with the picture.

The overall operation of the above-described recording data display apparatus will be described hereinafter using several examples shown in FIGS. 6 to 10.

Figure 6:
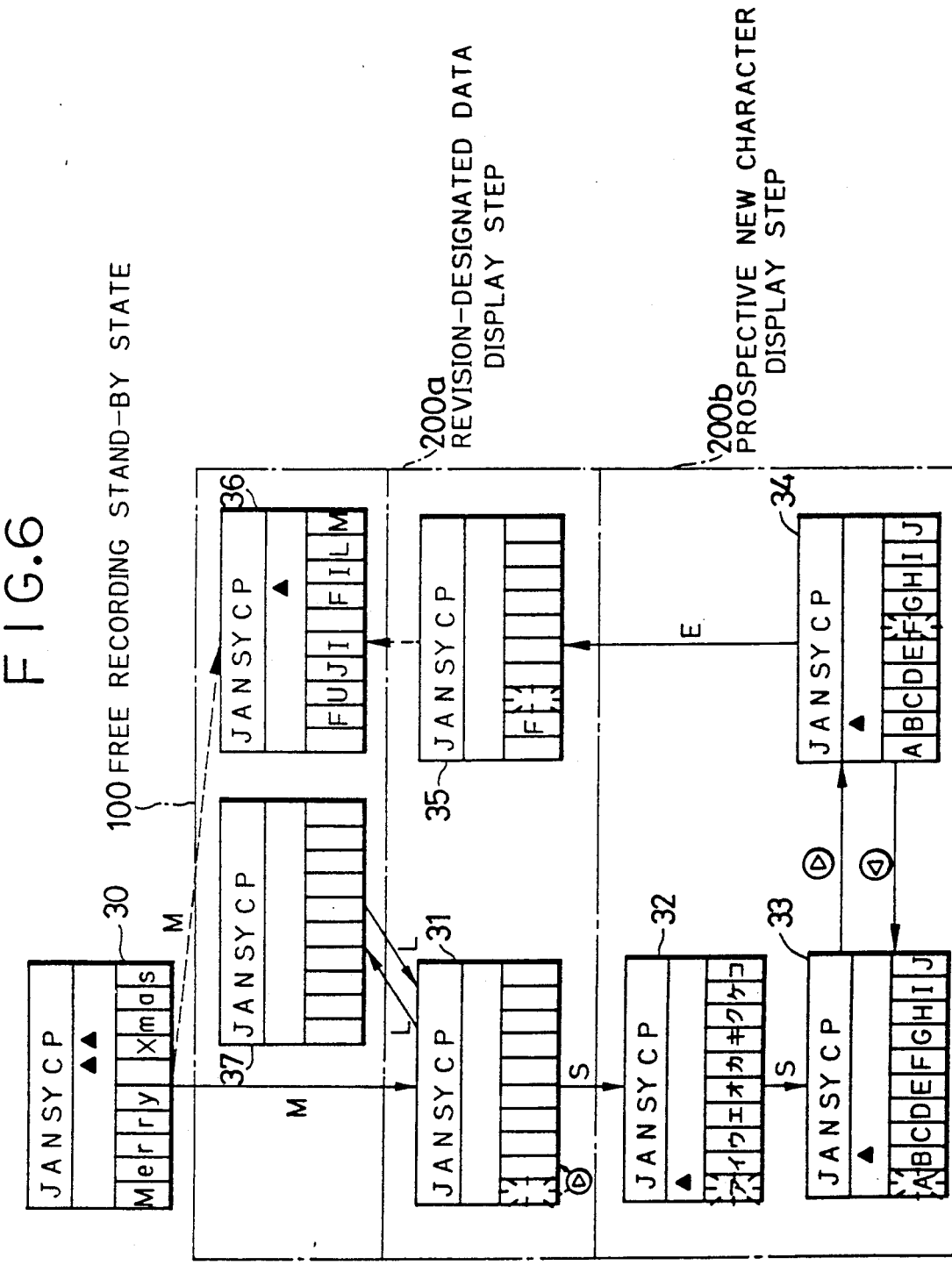
FIGS. 6 to 10 schematically show several examples of the display method of the present invention.

FIG. 6 shows an example of setting an array of characters "._.FUJI._.FILM" as selected recordable data ("._." is representative of a blank space). The display panel 1 initially displays a predetermined caption "Merry Xmas", in the caption recording mode, wherein the indicator portion 4 indicates the index positions "CAP" and "PRI". It is to be noted that the index positions "JAP", "ALP", "NUM", "SYM", "CAP" and "PRI" are simply designated by J, A, N, SY, C and P, respectively, in FIGS. 6 to 10.

When the M key 6 is depressed in this display condition 30, and if no data have been stored in the memory 21 in the preceding selectable data recording mode, the display control circuit 22 changes to the data revision state 200 of the selectable data recording mode, skipping over the selectable recording stand-by state 100. Because no selectively recordable data are stored, a display condition 31 appears in the revision-designated data display step 200a of the data revision state 200. In the condition 31, the left-end display segment blinks at the beginning. This blinking is used to designate a display segment in which a new character should be set, and the blinking position can be shifted to another display segment by the left and right shift keys 10a and 10b. In this example, the left-end segment is intended to be a black space, the blinking position is shifted to the second-from-left segment by the right shift key 10a.

Thereafter, when the S key 7 is depressed, the process proceeds to the prospective new character display step 200b, so that the first character group "ア イ カ エ ス カ キ ク ケ コ" is displayed on the display panel 1 (display condition 32). In the display condition 32, because the Kana characters are displayed, the indicator portion 4 indicates the index position "JAP".

Since an alphabetic character "F" is to be set in the second-from-left display segment in this example, the S key 7 is depressed to change the Kana display condition 32 to an alphabet display condition 33 wherein the seventh character group is displayed, and the indicator 4 indicates the index position "ALP". Thereafter, by depressing the right shift key 10b five times, the blinking position is shifted to the display segment displaying "F", as shown in condition 34. If the E key 11 is depressed in this condition 34, the left second character is set as shown in condition 35 and, at the same time, the third-from-left display segment begins to blink as the next segment to be revised.

Character setting in the third-from-left and following display segments is performed in the same way as above, using the S key 7, the UP and DOWN keys 9a and 9b, as well as the left and right shift keys 10a and 10b, until the desired character array "._.FUJI._.-FILM" is displayed as shown in condition 36. When the L key 8 is depressed in this condition 36, the display control circuit 22 shifts to the selector recording stand-by state 100, wherein it is possible to record the displayed data on the photographic film in synchronism with depression of the shutter button 16. In the free recording stand-by state 100, the indicator portion 4 displays the index position "PRI" only. In this way, it is unnecessary to provide an index position specific to indicating the selectable recording stand-by station 100. As for the data recording mode and the time-of-day recording mode, no index position is necessary because these modes are obvious from the display.

When the display control circuit 22 is shifted to the selectable recording stand-by state 100, the displayed character data, the data as shown in condition 36 in this instance, are recorded in the memory 21. Thereafter, the M key 6 is actuated to set the display panel 1 in the selectable data recording mode, and the display condition 36 appears on the display panel 1.

As shown in condition 37, if the L key 8 is depressed in the condition 31, the display control circuit 22 is reset to the free recording stand-by state 100 but has no recordable data. In the condition 37, since all the display segments display no characters, the indicator portion 4 indicates no index position. If the L key 8 is depressed thereafter so as to shift the process again to the revision-designated data display step, the display panel 1 displays the condition 31, because no recordable data have been stored.

In the revision-designated data display step 200a, if any character has already been displayed in the segment to be revised, the index position corresponding the kind of the displayed character is indicated by the indicator portion 4.

Figure 7:
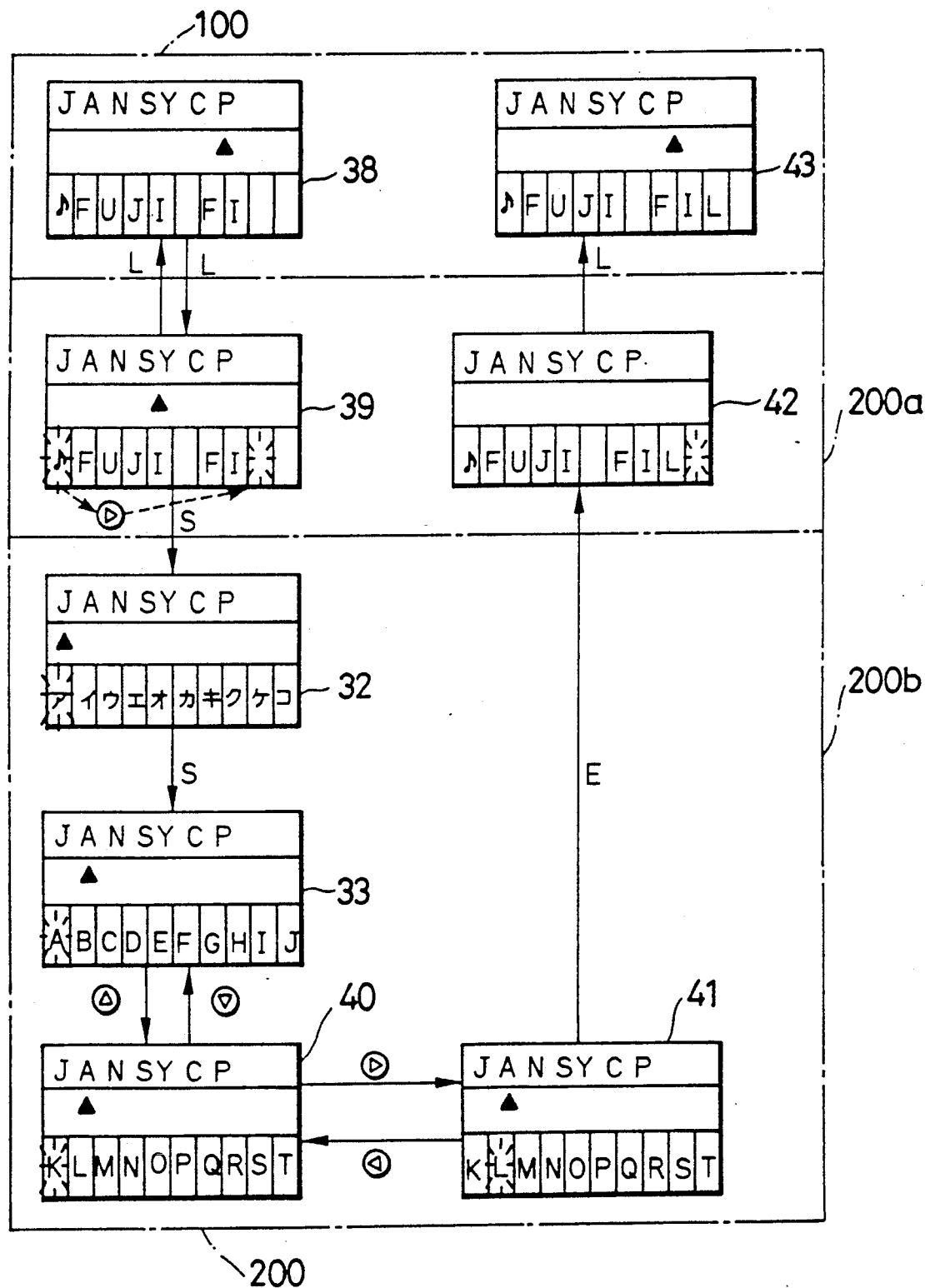

FIG. 7 illustrates a case wherein a character array "♪FUJI._.FI._._." has been previously stored as selected recordable data. In this case, the display panel 1 is set in a condition 38 displaying the previously stored selected recordable data during the selectable recording stand-by state 100. Upon depression of the L key 8, the display panel 1 changes to the data revision state 200, wherein the leftmost display segment starts blinking in the revision-designated data display step 200a. Assuming that it is desired to set " FUJI._.FILM" as selected recordable data, the right shift key 10b is depressed eight times so as to designate the ninth display segment to be changed, as shown in condition 39.

Thereafter, the S key 7 is depressed to select the kind of prospective new characters. Since the ninth display segment is required to display "L", the S key 7 is depressed once so as to jump the display 1 from the condition 32, the first character group of Kana characters, which is always displayed at first in the prospective new character display step, into the seventh character group, that is, the Roman alphabet (condition 33). Then, the UP key 9a is depressed to select the eighth character group including "L", as shown in condition 40, and thereafter, the right shift key 10b is depressed once thereby to shift the blinking position into the second-from-left display segment displaying "L". When the E key 11 is depressed in this condition 41, "L" is selected to be displayed on the ninth segment, and the next segment, that is, the tenth segment in this instance, begins to blink in the revision-designated data display step 200a, as shown in condition 42.

In order to set a further character, a similar operation as described above with reference to conditions 32, 33, 40, 41 and 42 is repeated. If, however, the user wishes to record the display condition 42, it is possible to shift the display panel 1 into the selectable recording stand-by station 100, as shown in condition 43, by depressing the L key 8, whereby the character data displayed in condition 43 are stored as complete recordable data. When the shutter button 16 is depressed in this condition 43, an array of characters as shown in condition 43 is recorded on the film.

Figure 8:
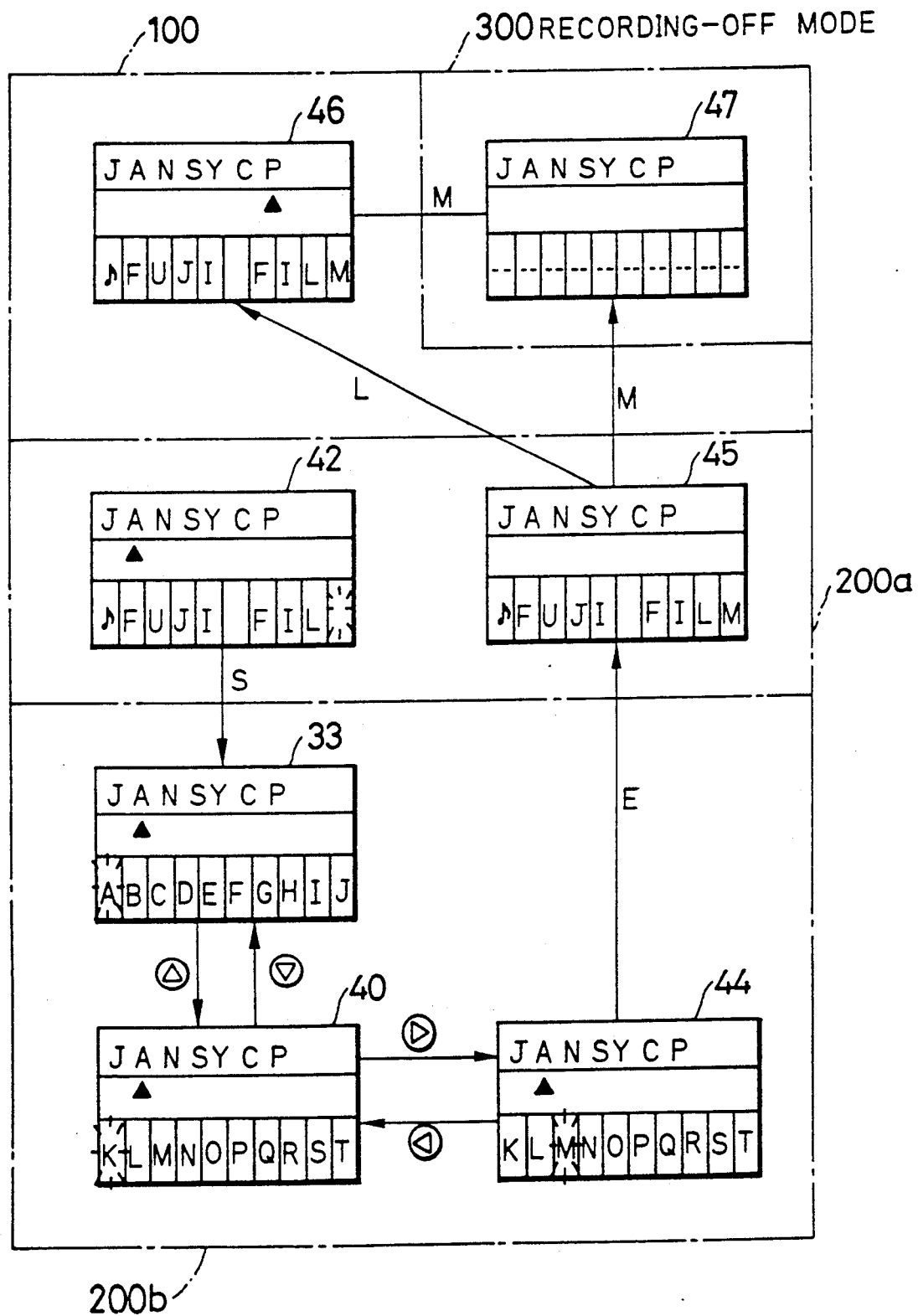

FIG. 8 illustrates the case wherein the character "M" is set in the tenth display segment in continuation of the condition 42. As shown, when the S key 7 is depressed to set the prospective new character display step 200b, at first the seventh Roman alphabet character group is displayed in this case. That is, when a character is selected by the E key 11, the kind of the character is memorized simultaneously in the memory 21, so that the character group of the memorized kind is immediately displayed when the S key 7 is actuated to return to the prospective new character display step 200b. Thereafter, the UP key 9a is depressed once so as to select the eight character group (condition 40), and the character "M" is designated by means of the right shift key 10b (condition 44), and is selected by means of the E key 11 (condition 45).

In this condition 45, all the display segments do not blink, although, according to the above description, the blinking position should shift to the segment next to a just-changed display segment, the leftmost segment in this instance, in the revision-designated data display step 200a after the E key 11 is depressed. This is because this condition 45 is judged as a complete recordable data setting condition.

When the L key 8 is depressed in this condition 45, the display 1 shifts to the selectable recording stand-by state 100, wherein the displayed character data can be recorded on the film. If the M key 6 is depressed in condition 45, the display 1 shifts to the non-recording mode 300, as shown in condition 47, wherein data recording is not effected and no data are displayed, but the character data displayed in condition 46 are stored in the memory 21. If the M key 6 is depressed thereafter so as to set the selectable data recording mode, the display panel 1 displays the stored character data 46.

If, on the contrary, the M key is depressed in the prospective new character display step 200b, the display panel 1 also shifts to the non-recording mode, but the characters which have been set in the preceding steps of the same data revision state and have been temporarily stored, are canceled. In this case, the memory 21 is reset to the previous storage condition that was displayed at the beginning of the present data revision state 200, that is, the data stored in the preceding data revision state.

Figure 9:
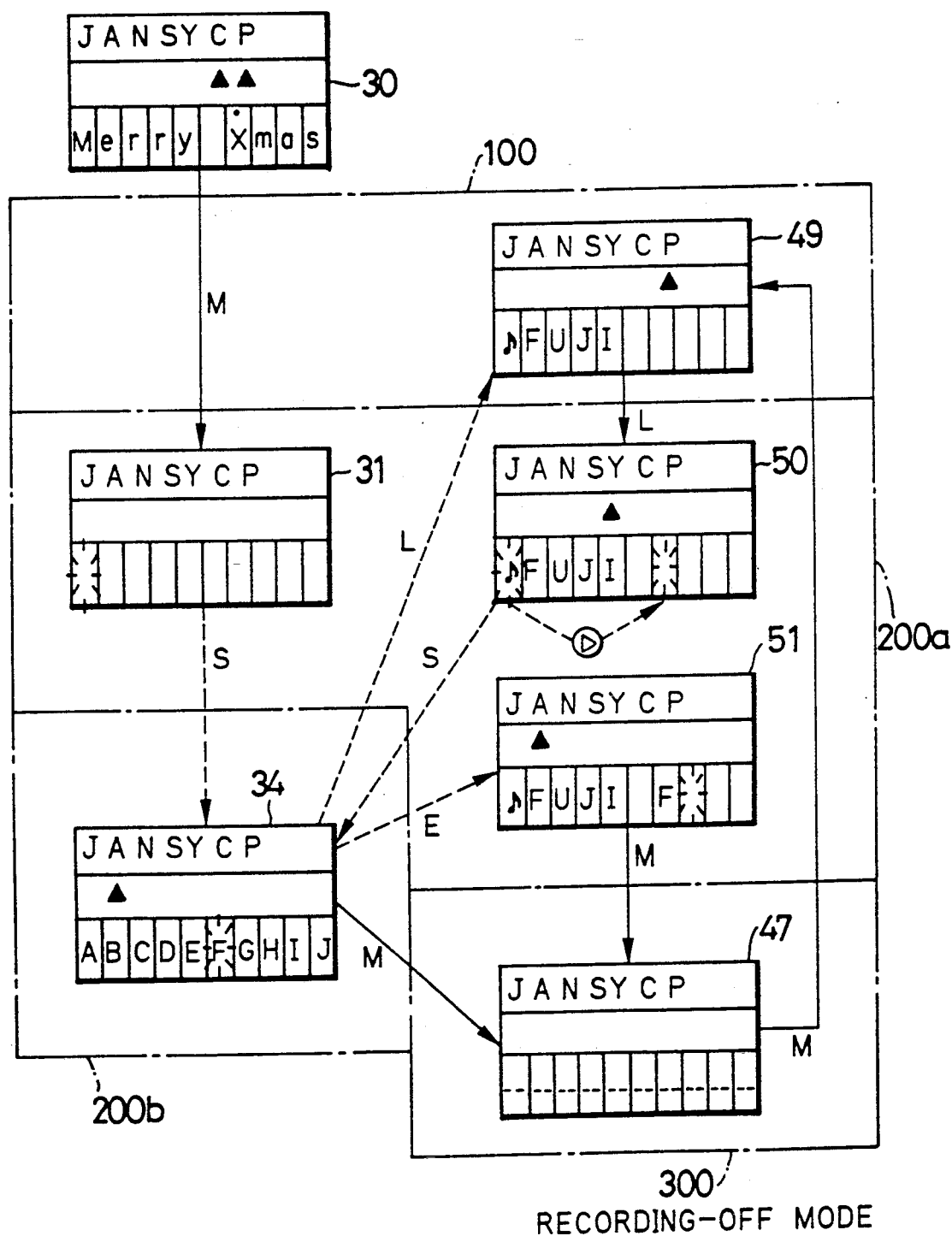

FIG. 9 is intended to explain the data revision cancel operation with respect to a case wherein "♪FUJI._._._._._." has been set and recorded, and the display panel 1 is now in condition 34. If, for example, the M key 6 is depressed in condition 34, the display panel 1 changes into condition 47 that shows the non-recording mode 300, and the temporary storage of the character "F" set in the condition 34 is released, thereby resetting the memory 21 to the previous storage condition. Therefore, when the M key 6 is actuated to set the selectable data recording mode again, display condition 49 appears.

When the L key 8 is depressed in condition 49, the display panel 1 changes to condition 50. Assuming that "♪ FUJI._.FILM" is to be set, the seventh segment is designated in the revision-designated data display step, and the character "F" is selected by means of the S key 7 and right shift key 10b (condition 34). Upon depression of the E key 11 in this condition 34, the display panel 1 changes to condition 51. If the M key 6 is depressed, the display panel 1 also shifts to the non-recording mode 300. Also in this case, the temporary storage of the character "F" is released, even after the selection of this character by means of the E key 11, and the memory 21 is reset to the previous storage condition.

Only when the character data are selected up to the right end display segment, the character data are stored as complete recording data in the memory 21 upon depression of the M key 6 without first depressing the L key 8, as is described above with reference to FIG. 8. In this way, data setting efficiency is improved.

As shown in FIG. 4, if the M key 6 is depressed in the selected recording stand-by station 100, the display panel 1 also changes to the non-recording mode 300. Also when the M key 6 is depressed in the revision-designated data display step 200a, the display panel 1 is set in the non-recording mode 300. In this way, the M key 11 serves not only as the mode change key but also as a data revision cancel key, so that no specific cancel key for canceling data setting is necessary.

Figure 10:
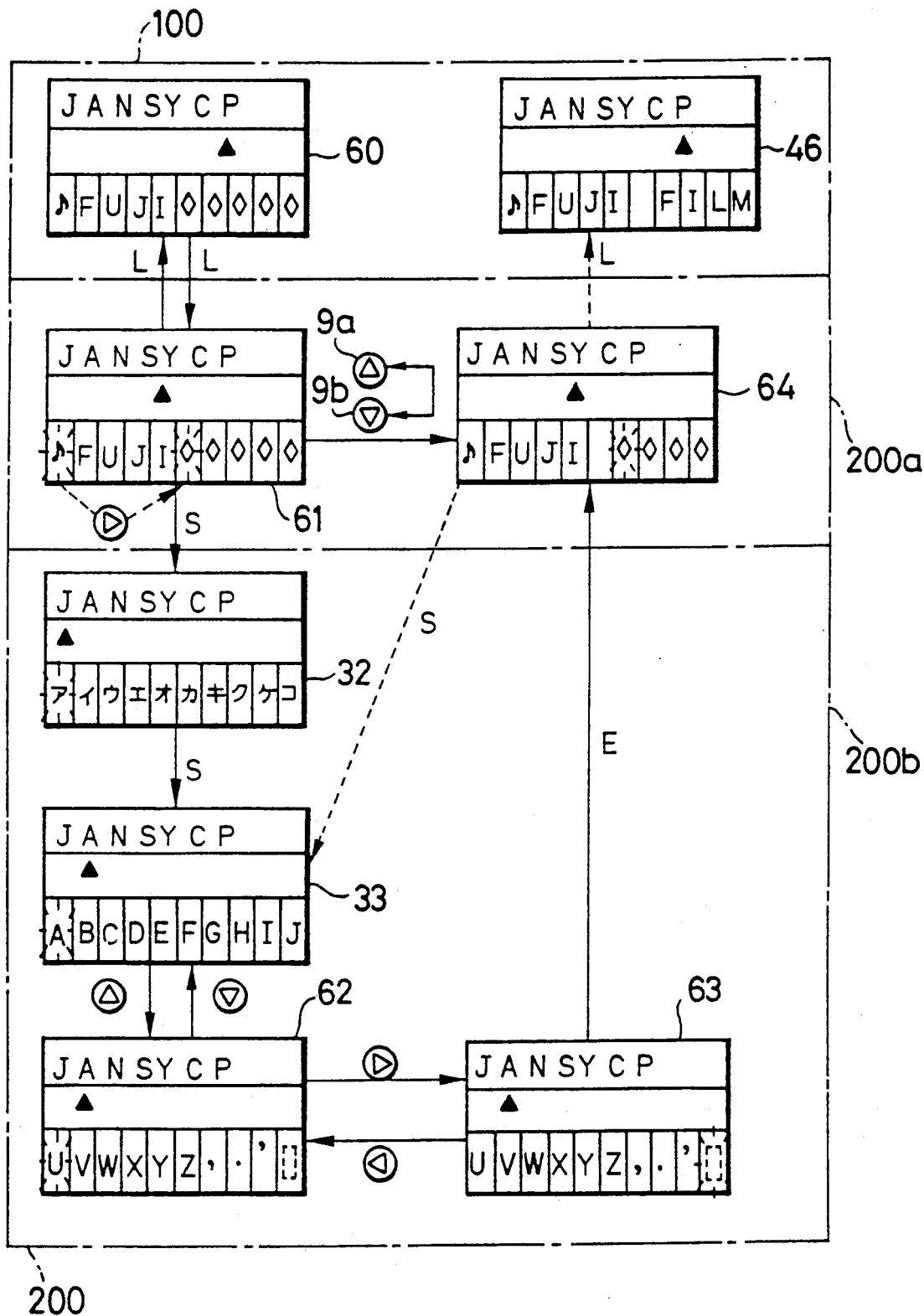

According to this embodiment, a blank space can be set in many ways. Namely, as shown on the data menu of FIG. 3, blank spaces are memorized as elements 90 of the fourth and ninth character groups, so that it is possible to set a blank space in the same way as other characters. FIG. 10 illustrates an example of this method of blank space setting. In this example, an array of characters displayed in condition 60 was set in the preceding data revision step 200, and it is desired to set " ♪ FUJI-.__.FILM" (condition 46) in the end.

Because it is necessary to set a blank space in the sixth-from-left segment, the blinking position is shifted to the sixth-from-left segment in the revision-designated data display step 200a (display condition 61). Then, the S key 7 is depressed to display the seventh character group as the leading group of Roman alphabet groups (display conditions 32 and 33). And then the UP key 9a is depressed to display the ninth character group (display condition 62), and the left shift key 10b is depressed once so as to shift the blinking position to the rightmost segment where the blank space 90 is displayed (condition 63). Upon depression of the E key 11 in this condition 63, the blank space 90 is selected to be displayed as a component of recordable data in the sixth segment, and the next, i.e. the seventh segment begins to blink in the next revision-designated data display step 200a (condition 64).

According to this embodiment, when a blank space 90 is selected, there is memorized the kind of character group, Kana or alphabet, in this instance, to which the blank space belongs, so that the leading group of the same kind as the character group displayed immediately before selection of the blank space 90 will be displayed in the next prospective new character display step 200b. In this example, because the blank space 90 is the ninth, selected from the alphabet character group, the seventh character group (condition 33) is displayed upon depression of the S key 7 in condition 64. Therefore, it is possible to select "F" quickly without displaying any Kana character group.

Although a blank space can be set in the prospective new character display step 200b according to the just-described blank space setting operation, a blank space can also be set by depressing the UP key 9a simultaneously with the DOWN key 9b in the revision-designated data display step 200a, as is illustrated in FIG. 4, whereby the character displayed in the blinking segment is deleted and replaced by a blank space. In this case, if a blank space is set at the beginning of a data revision state, no character kind is memorized. But if any character, "I", for instance, has been set in the display segment before the blank space in the same data revision state, the character kind, that is, Roman alphabet in this instance, is memorized, in order to display immediately one Roman alphabet character group in the next prospective new character display step 200b.

The indicator portion 4 does not indicate any index position also when a blank space is designated to be changed in the revision-designated data display step 200a. On the contrary, if the segment to be changed displays a previously set character, the indicator 4 indicates the index position corresponding to the kind of the displayed character, as is described above.

Furthermore, it is possible to delete all of the displayed characters by depressing the UP and DOWN keys 9a and 9b simultaneously for 1.5 seconds. Therefore, the display condition 31 as shown in FIGS. 6 and 9 can be set not only at the beginning of data revision, but also in the course thereof. Also in the display condition 31 set in the course of data revision, the indicator portion 4 indicates no index position.

When no data are displayed on the display panel 1 in the selected recording stand-by state 100, as is shown in condition 37 of FIG. 6, the lamps 23 is turned off. If the lamp 23 were still turned on when the shutter button 16 is depressed in this condition, the margin of display panel 1 would be faintly recorded. Therefore, the lamp 23 is turned off so as to prevent such an undesirable recording of the margin of display panel 1. It is to be noted that the lamp 23 is turned off and the indicator portion 4 indicates no index position whenever the display panel 1 displays no data, irrespective of how such an entirely blank condition has been set.

Although the present invention has been described above with reference to the preferred embodiments shown in the drawings, it will be understood that the present invention is not intended to be limited by the above-described embodiments, but, on the contrary, various modifications of the present invention can be effected without departing from the spirit and scope of the appended claims.

For example, it is possible to provide an index position specific for the selected data recording mode and to indicate the caption-recording mode by not indicating the specific selected data recording mode mark, although the above embodiment is provided with an index position "CAP" for the caption recording mode, and by definition the selected data recording mode takes place when the "CAP" is not indicated.

The cover 12 can also close the keys 6 and 7 in the same way as for the keys 8 to 11.

Although a blank space can be set by simultaneously depressing the UP key 9a and the DOWN key 9b in the above embodiment, it may be possible to set a blank space by simultaneously depressing two other keys instead, e.g. the left shift key 10a and the right shift key 10b.

The present invention is applicable to display an array of optional characters not only in the selected data recording mode but also in other modes, e.g. in a mode wherein character data can be freely set as a part of recordable data.

What is claimed is:

1. A recording data display method for a camera in which character data to be recorded on a photographic film are displayed on a display device, said method comprising a selectable data recording mode comprising the steps of:
    a) displaying character data to be revised;
    b) designating a first character to be change in said character data;
    c) displaying a plurality of character groups in a predetermined sequence on said display device wherein said character groups include various character kinds, each of said character groups consisting of a plurality of different characters of the same kind, thereafter;

d) selecting one of said character groups which includes a second character;

e) designating said second character from among a plurality of simultaneously displayed characters which compose said selected character group;

f) temporarily storing said second character, and when said selected data recording mode is terminated before executing step h), said temporary storage of said second character is cancelled, and said first character is maintained stored;

g) setting said second character in place of said first character;

h) repeating steps b) to f) until all necessary characters have been set to form new character data; and i) displaying said new character data as data ready to be recorded.

2. A recording data display method as claimed in claim 1, wherein said character groups consist of predetermined number of the same kind characters which is the maximum number of characters that can be simultaneous displayed on said display device.

3. A recording data display method as claimed in claim 1, wherein said characters within said character groups comprising characters of the same kind include various symbols, one of said symbols being indicative of a blank space.

4. A recording data display method as claimed in claim 1, wherein step c) comprises the steps of:

transferring from a leading character group of a first kind to a leading character group of a second kind; and shifting from one group to another of said character groups in a given sequence within the same kind of character groups.

5. A recording data display method as claimed in claim 1, wherein character data displayed in step i) are stored until revised in a next selected data recording mode.

6. A recording data display method as claimed in claim 1, wherein character data stored in a preceding selected data recording mode are displayed in step a) of said selected data recording mode.

7. A recording data display method as claimed in claim 1, wherein when said second character is set in step g), the character kind of said second character is stored, and a character group of the same kind as said second character is firstly displayed in step c) when setting the next character.

8. A recording data display method as claimed in claim 1, wherein when a blank space is to be set in step g), a character group of the same kind as a character set preceding said blank space is firstly displayed in step c) when setting the next character.

9. A recording data display method as claimed in claim 1, wherein when said selected data recording mode is changed to another mode after step i), the character data displayed in step h) are stored.

10. A recording data display method as claimed in claim 1, wherein character data displayed in step a) are recorded immediately in synchronism with an exposure made by the camera.

11. A recording data display apparatus for a camera in which data to be recorded on a photographic film are displayed in various recording modes, said apparatus comprising:

a display panel having a predetermined number of segments;

a display control unit for controlling said display panel;

a memory in said display control unit;

setting means for setting said display control unit in a selected data recording mode in which character data to be recorded can be selectively set on said display panel;

designating means for designating one of said segments in which a new character is to be set;

selecting means for selecting one of a plurality of character groups displayed in a predetermined sequence on said display device, wherein said character groups include various character kinds, each of said character groups consisting of a plurality of different characters of the same kind;

selecting means for selecting a character to be set in said designated segment from among a plurality of simultaneously displayed characters of said one selected character group, said memory temporarily storing said characters selected and deleting said stored characters when said selected recording mode is interrupted, whereby character data stored in a preceding free recording mode is maintained unchanged in said memory;

recording means for recording character data on the photographic film; and actuating means for actuating said recording means.

12. A recording data display apparatus as claimed in claim 11, wherein said character groups consist of a predetermined number of a plurality of characters of the same kind which corresponds to the number of said segments.

13. A recording data display apparatus as claimed in claim 11, wherein at least one of said character groups includes a symbol indicative of a blank space.

14. A recording data display apparatus as claimed in claim 11, wherein said selecting means comprise a first key member for selecting one of said character kinds, and a second key member for shifting from one group to another of said character groups in the same character kind.

15. A recording data display apparatus as claimed in claim 14, wherein said first key member is used to select one of a plurality of predetermined captions in a caption recording mode.

16. A recording data display apparatus as claimed in claim 11, wherein said apparatus comprises means for setting a blank space upon simultaneous actuation of two predetermined keys of said key members.

17. A recording data display apparatus as claimed in claim 11, wherein said recording means comprises means for optically recording said character data, said means for optically recording said character data further comprising a lamp which is turned off when all of said segments display no data.

18. A recording data display apparatus as claimed in claim 11, further comprising an indicator means for indicating a presently set recording mode.

19. A recording data display apparatus as claimed in claim 11, wherein said indicator means for indicating a presently set indicator mode also indicates the character kind of a presently selected character or character group.

20. A recording data display apparatus as claimed in claim 11, wherein said indicator means for indicating a presently set indicator mode is turned off when the presently selected character is a blank space.

21. A recording data display apparatus as claimed in claim 11, wherein said memory comprises a means for storing said character groups and character data set in said selected data recording mode.

22. A method of displaying character data selected to be recorded on a photographic film in a camera, comprising:
providing a data revision state for setting a character array as selected recordable data,
providing a revision-designated data display mode wherein character data stored previously are displayed as data to be revised and, at the same time, characters to be changed in said character data are made to blink one after another, and
providing a prospective new character display mode wherein a plurality of predetermined character groups are displayed group by group as a plurality of simultaneously displayed prospective new characters, said prospective new character display mode being set after said revision-designated data display mode upon a key operation.

23. A method of displaying character data selected to be recorded on a photographic film in a camera, comprising:
providing a data revision state for setting a character array as selected recordable data, which comprises a revision-designated data display mode wherein character data stored previously are displayed as data to be revised and, at the same time, characters to be changed in said character data are made to blink one after another, and establishing a prospective new character display mode wherein a plurality of predetermined character groups are displayed group by group as a plurality of simultaneously displayed prospective new characters, said prospective new character display mode being set after said revision-designated at a display mode upon a key operation; and
when one of said prospective new characters is selected by means of a selection key, it returns from said prospective new character data display mode to said revision-designated data display mode, and then a character to the right of said character, which was made to blink in the preceding revision-designated data display mode, is made to blink.

24. A method of displaying character data selected to be recorded on a photographic film in a camera, comprising establishing a data revision state for setting a character array as selected recordable data, comprising a revision-designated data display mode wherein character data stored previously are displayed as data to be revised and, at the same time, characters to be changed in said character data are made to blink one after another, and a prospective new character display mode wherein a plurality of predetermined character groups are displayed group by group as a plurality of simultaneously displayed prospective new characters, said prospective new character display mode being set after said revision-designated data display mode upon a key operation; and when a character at the right end of a linear array of revision-designated data is changed by a new character selected among said prospective new characters, by means of decision key, said right end new character is continuously displayed.

25. A display apparatus of a camera for displaying character data selectable to be recorded on a photographic film, comprising:
a) means for changing the character kind of a displayed character group from one to another, by switching from a predetermined character group of one kind to a predetermined character group of another kind upon actuation of a character kind transfer key, wherein said character groups include various character kinds, each of said character groups consisting of a plurality of simultaneously displayed different characters of the same kind; and
b) means for displaying first one character group and then another within the same said kind upon actuation of a group shift key.

26. A display apparatus of a camera for displaying character data selectable to be recorded on a photographic film, wherein a data revision state for setting a character array as selected recordable data comprises a revision-designated data display mode wherein character data stored previously are displayed as data to be revised and, at the same time, characters to be changed in said character data are made to blink one after another, and a prospective new character display mode wherein a plurality of predetermined character groups are displayed group by group as a plurality of simultaneously displayed prospective new characters, said prospective new character display mode being set after said revision-designated data display mode upon a key operation; and
a means for cancelling storage of revised data and maintaining said previously stored character data upon actuation of a mode change key for selecting one of various recording modes in said data revision state.

27. A display apparatus of a camera for displaying character data selectable to be recorded on a photographic film, wherein a data revision state for setting a linear character array as selected recordable data comprises a revision-designated data display mode wherein character data stored previously are displayed as data to be revised and, at the same time, characters to be changed in said character data are made to blink one after another, and a prospective new character display mode wherein a plurality of predetermined character groups are displayed group by group as a plurality of simultaneously displayed prospective new characters, each of said character groups consisting of a plurality of different characters of the same kind, said prospective new character display mode being set after said revision-designated data display mode upon a key operation; and
a means for storing a revised linear character array as new character data upon actuation of a mode change key for selecting one of various recording modes which is actuable in said data revision state and operative upon choosing a right end character of said linear character array among said prospective new characters and selection of said right end character upon actuation of a selection key.

28. A display apparatus of a camera for displaying character data selectable to be recorded on a photographic film, comprising means for deleting a character of said character data in a revision-designated data display mode of a data revision state for setting an optional character array, by simultaneously depressing two keys, so as to set a blank space instead.

* * * * *